(12) United States Patent
Morris

(10) Patent No.: US 9,038,943 B1
(45) Date of Patent: May 26, 2015

(54) SAFETY AILERON SYSTEM

(71) Applicant: Ralph F. Morris, Glendale, AZ (US)

(72) Inventor: Ralph F. Morris, Glendale, AZ (US)

(*) Notice: Subject to any disclaimer, the term of this patent is extended or adjusted under 35 U.S.C. 154(b) by 0 days.

(21) Appl. No.: 14/316,260

(22) Filed: Jun. 26, 2014

Related U.S. Application Data

(60) Provisional application No. 61/978,566, filed on Apr. 11, 2014.

(51) Int. Cl.
*B64C 9/00* (2006.01)
*B64C 13/04* (2006.01)

(52) U.S. Cl.
CPC . *B64C 9/00* (2013.01); *B64C 13/04* (2013.01); *B64C 2009/005* (2013.01)

(58) Field of Classification Search
USPC ............ 244/90 R, 215, 217, 216, 213, 225
See application file for complete search history.

(56) References Cited

U.S. PATENT DOCUMENTS

| | | | | |
|---|---|---|---|---|
| 1,785,620 A * | 12/1930 | Frise | ............. | 244/216 |
| 1,789,215 A * | 1/1931 | Cato | ............. | 244/90 R |
| 2,507,741 A * | 5/1950 | Trimble, Jr. | ............. | 244/90 R |
| 3,253,809 A * | 5/1966 | Robertson | ............. | 244/89 |
| 3,598,340 A * | 8/1971 | Thurston | ............. | 244/90 R |
| 4,544,118 A * | 10/1985 | Robinson | ............. | 244/225 |
| 5,094,412 A * | 3/1992 | Narramore | ............. | 244/214 |
| 6,467,733 B1 * | 10/2002 | Young et al. | ............. | 244/215 |
| 6,554,229 B1 | 4/2003 | Lam et al. | | |
| 6,984,109 B2 * | 1/2006 | Bagai | ............. | 416/1 |
| 8,079,546 B2 * | 12/2011 | Barrows | ............. | 244/90 R |
| 8,113,465 B2 | 2/2012 | McAlinden et al. | | |
| 8,336,829 B2 * | 12/2012 | Reckzeh et al. | ............. | 244/216 |

* cited by examiner

*Primary Examiner* — Christopher P Ellis
(74) *Attorney, Agent, or Firm* — Keith L. Jenkins, Registered Patent Attorney, LLC; Keith L. Jenkins

(57) ABSTRACT

Individually operable ailerons pivotable to extend a forward end below a bottom wing surface and a rearward end above a top wing surface. The extended aileron forward end increases drag and subsumes the rudder function in the turn, while the aileron rear end produces drag and airflow redirection to reduce lift on the wing. The advantage of the safety ailerons is that habitual or instinctive pilot inputs to the yoke will recover from a dropped-wing stall at low speed and altitude, while conventional ailerons require counter-intuitive pilot actions to avoid crashing in such conditions.

18 Claims, 4 Drawing Sheets

SAFETY AILERON SYSTEM

RELATED APPLICATIONS

This application claims the benefit of U.S. provisional patent application 61/978,566 filed Apr. 11, 2014 to the same inventor, the contents of which are included herein by reference.

FIELD OF ART

The present invention relates to an aileron system that causes an aircraft to safely respond to a pilot's habitual actions in situations where the pilot's habitual actions would normally be hazardous. The present invention relates to an aileron system that uses unsynchronized ailerons to simultaneously cause yaw and roll and which can recover an aircraft from a dropped-wing stall by intuitive or habitual use of the yoke.

BACKGROUND OF THE INVENTION

Conventional aircraft execute turns using ailerons, which are aerodynamic devices that work as a synchronized opposing pair along the trailing edges of opposing wings. A first aileron rotates upward to give a first wing a downward aerodynamic force and the second aileron simultaneously rotates downward to give the second wing an upward force to roll the aircraft, thereby rotating the lift vector and so creating a horizontal component of lift that moves the aircraft horizontally to execute the turn. Synchronized ailerons produce differential profile drag, producing a reverse yaw effect that must be compensated for with a rudder.

Many crashes with loss of life have resulted from low speed stalls on final approach to landing, because only a highly-skilled pilot can resist the normal reaction to a wing dropping. The normal reaction is to turn the yoke in the direction opposite the low wing, which would normally (at higher speeds and altitudes) be the correct response. In response to the reaction, the low wing gains additional lift from the increase in camber caused by the drooping aileron, and the raised aileron on the opposite wing reduces lift on that wing. These combined forces cause the wings to become level. However, when the aircraft has slowed to minimum approach speed, and a wing drops, the normal reaction of turning the yoke in the opposite direction increases the camber of the low, slow wing and so increases drag on that wing, which is likely to cause the wing to stall and induce a tailspin from which even a skilled pilot could not recover at final-approach altitude. The correct procedure in this case is to lower the nose and increase power to avoid the stall. The skilled pilot must recognize that only increasing speed will allow the aircraft to maintain level flight and normal glide path to escape a low-altitude dropped wing stall using conventional ailerons.

Thus, there is a need for an aileron system that will cause the aircraft to avoid a low-speed dropped-wing stall in response to the intuitive reaction of a relatively unskilled pilot rather than require the reasoned reaction of a skilled pilot.

SUMMARY OF THE INVENTION

The present invention provides an aileron system that causes the aircraft to avoid a low-speed dropped-wing stall in response to the intuitive reaction of a relatively unskilled pilot. With the safety aileron system of the present invention, only one aileron operates at any time. The safety aileron pivots further back than conventional ailerons and so never droops like a conventional aileron. Rather the safety aileron rotates to position its leading edge below the bottom surface of the wing and position the trailing edge of the aileron above the surface of the wing. Turning the yoke in the intuitive direction (opposite the turn) works without inducing a stall, since the aileron on the low side doesn't move at all. The opposite (high side) safety aileron activates, reducing the lift of that wing to level the aircraft, instead of increasing lift (and drag) on the low side and risking a stall. The safety aileron on the high side lowers its leading edge below the wing, causing drag that produces a yawing moment toward that wing. This also increases the speed of the low wing, creating more lift and assisting in leveling the aircraft.

In addition to the low-speed safety features described herein, the safety aileron system is also superior to conventional ailerons at cruising speeds. First, because the safety aileron system provides both roll and yaw inputs in the same direction to effect a change in the aircraft's heading, little or no rudder input is required for normal turns. Rudder input will continue to be necessary for aerobatic maneuvers and crosswind landings, in the same manner as the rudder is used in conjunction with conventional ailerons. Second, the safety aileron system is of particular benefit in canard, flying-wing and other unconventional aircraft configurations where a rudder is not effective. Third, because the safety aileron system reduces overall drag, a fuel savings is also realized The safety aileron system has been successfully tested with unmanned aerial vehicles (UAVs) of both conventional and canard layouts.

DESCRIPTION OF THE FIGURES OF THE DRAWINGS

The present invention will hereinafter be described in conjunction with the following drawing figures, wherein like numerals denote like elements, the hundreds digits of reference numerals indicate the drawing number in which the feature is first referenced.

DETAILED DESCRIPTION OF THE INVENTION

Figure 1:
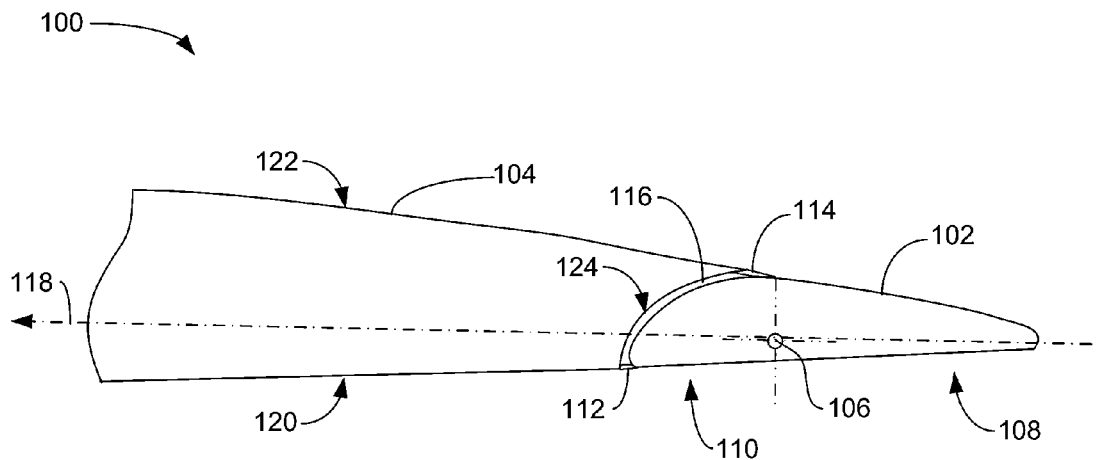
FIG. 1 is a side cross-sectional view illustrating an exemplary embodiment of the safety aileron system in a wings level flight configuration, according to a preferred embodiment of the present invention.

FIG. 1 is a side cross-sectional view illustrating an exemplary embodiment of the safety aileron system 100 in a wings level flight configuration, according to a preferred embodiment of the present invention. Wing section 104 is pivotably connected to safety aileron 102 by means known in the art for installing ailerons. However, the pivot axis 106 for the safety aileron is positioned further aft than with conventional ailerons. Likewise, the safety aileron 102 is larger, for a given aircraft 302 (see FIG. 3), than conventional ailerons. In some embodiments, particularly for high-speed aircraft, the pivot axis 106 may be moveable, in the manner of pivots for flaps, as is known in the art.

Wing section 104 has top surface 122, a bottom surface 120, and a rear surface 124. The shape of the safety aileron 102 preferably completes the shape of the wing section 104 for the airfoil type of the particular wing. Gap 116 between rear surface 124 and safety aileron 102 should be sized to permit operational rotation of the safety aileron 102 about pivot axis 106. Safety aileron 102 has a front portion 110 that is forward of the pivot axis 106 and a rear portion 108 that is aft of the pivot axis 106. Safety aileron 102 forms part of the trailing edge of the wing 104 during wings level flight, as shown in relation to forward direction 118. In some particular embodiments, gap covers 114 and 112 may be used to make continuous the top surface 122 and the bottom surface 120 of the wing, respectively, during wings level flight. Gap covers 114 and 112 may be flexible and resilient gap covers 114 and 112 such as, for non-limiting example, rubber gap covers 114 and 112. In a high speed aircraft, gap covers 114 and 112 may be more rigid retractable devices that are extendable from wing section 104.

Figure 2:
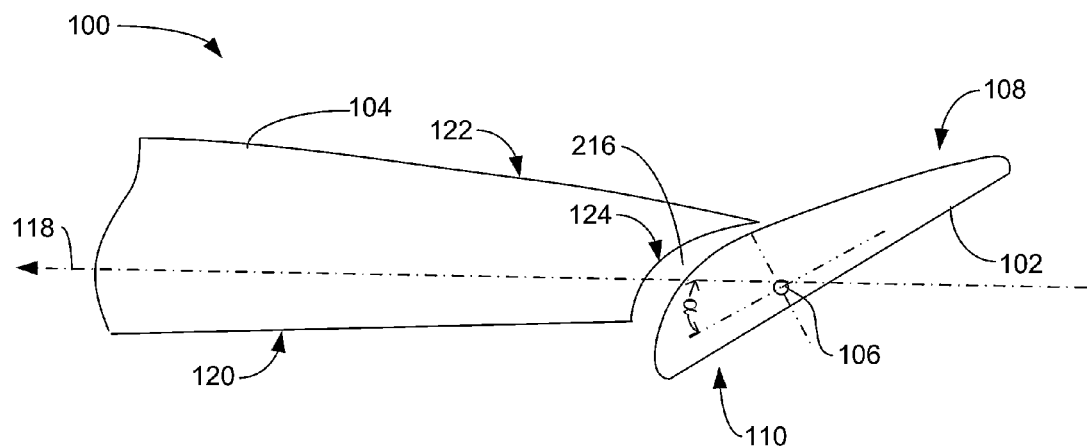
FIG. 2 is a side cross-sectional view illustrating the exemplary embodiment of the safety aileron system of FIG. 1 in a turning flight configuration, according to a preferred embodiment of the present invention.

FIG. 2 is a side cross-sectional view illustrating the exemplary embodiment of the safety aileron system 100 of FIG. 1 in a turning flight configuration, according to a preferred embodiment of the present invention. Safety aileron 102 is shown pivoted by pivot angle α into an operational position. Front portion 110 extends below the bottom surface 120 of the wing 104, thereby creating drag that induces yaw in the desired turning direction. The rear portion 108 extends above the top surface of the wing 104 to reduce lift on the wing 104, causing the wing 104 to lower in further execution of the turn. In normal operation, the turning direction wing will have the configuration of FIG. 2 and the other wing will concurrently have the configuration of FIG. 1. Only one wing's safety aileron 102 rotates at any given time. Pivot angle α is preferably controllably variable for varying rates of turn.

Gap 116 opens into slot 216 with safety aileron 102 rotated into active position. In various embodiments, slot 216 may be open to channel air flow or may be closed with further extended gap covers 114 and 112. In a particular embodiment, gap covers 114 and 112 may incompletely cover slot 216.

In dropping-wing stall avoidance operation, the safety aileron 102 is activated on the high wing 104 in response to intuitive or habitual yoke inputs to level the aircraft. The drag-induced yaw increases lift on the low wing, while the lift reduction on the high wing 104 assists in bringing the aircraft 302 (see FIG. 3) level and so avoids the stall.

Figure 3:
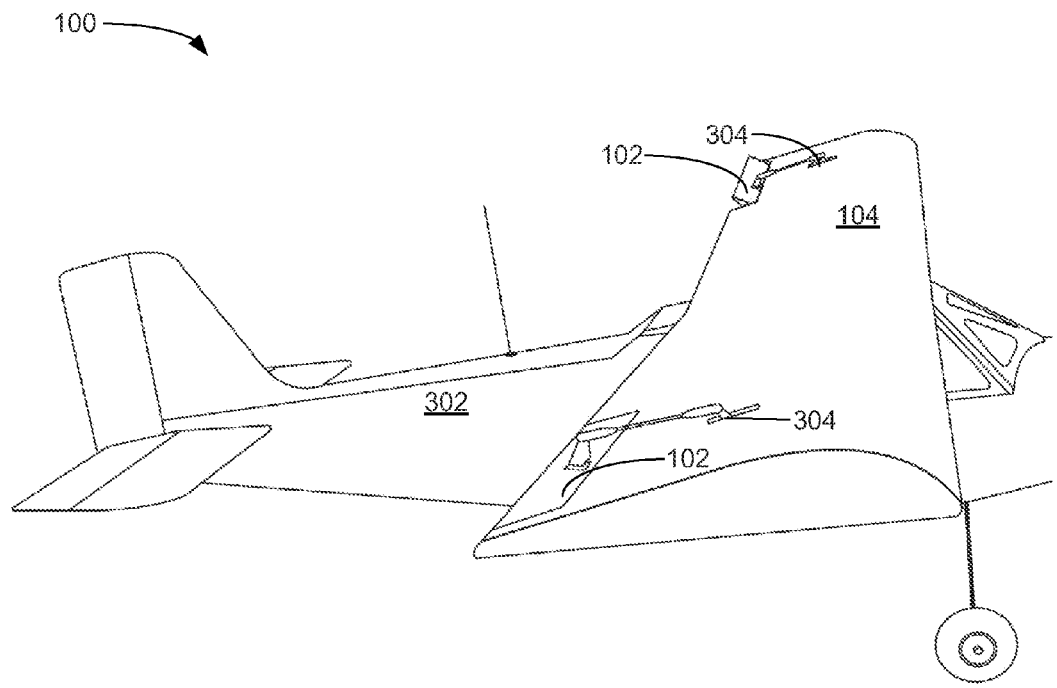
FIG. 3 is a photographic view illustrating an exemplary embodiment of the safety aileron system of FIG. 1 in a left turn configuration, according to a preferred embodiment of the present invention.

FIG. 3 is a photographic view illustrating an exemplary embodiment of the safety aileron system 100 of FIG. 1 in a left turn configuration, according to a preferred embodiment of the present invention. Unmanned Aerial Vehicle (UAV) test aircraft 302 has two safety ailerons 102 with actuators 304. The type of actuators 304 is not a limitation of the invention. The safety aileron 102 on the left wing 104 is shown in a left turn configuration for normal flight and in a configuration to avoid a right-dropped-wing stall in a dropped-wing stall avoidance flight regime. Right-wing safety aileron 102 is not activated in either case.

Safety aileron system 100 includes controls, actuators, and associated hardware and, in some embodiments, software. The actuators 304 are illustrated as a screw-type electro-mechanical actuator, but this is not a limitation of the invention. Actuators may include, for non-limiting examples, direct mechanical linkages from the yoke (manual operation), electro-mechanical (solenoid), hydraulic torsion, and pneumatic torsion actuators. Likewise, control systems may be, for non-limiting examples, analog mechanical, electrical (ON/OFF), electronic, and computer-controlled (fly-by-wire or wireless). Similarly, aircraft 302 may be any type of aircraft, including, for non-limiting examples, conventional two-winged aircraft, canard aircraft, and flying-wing aircraft.

Figure 4:
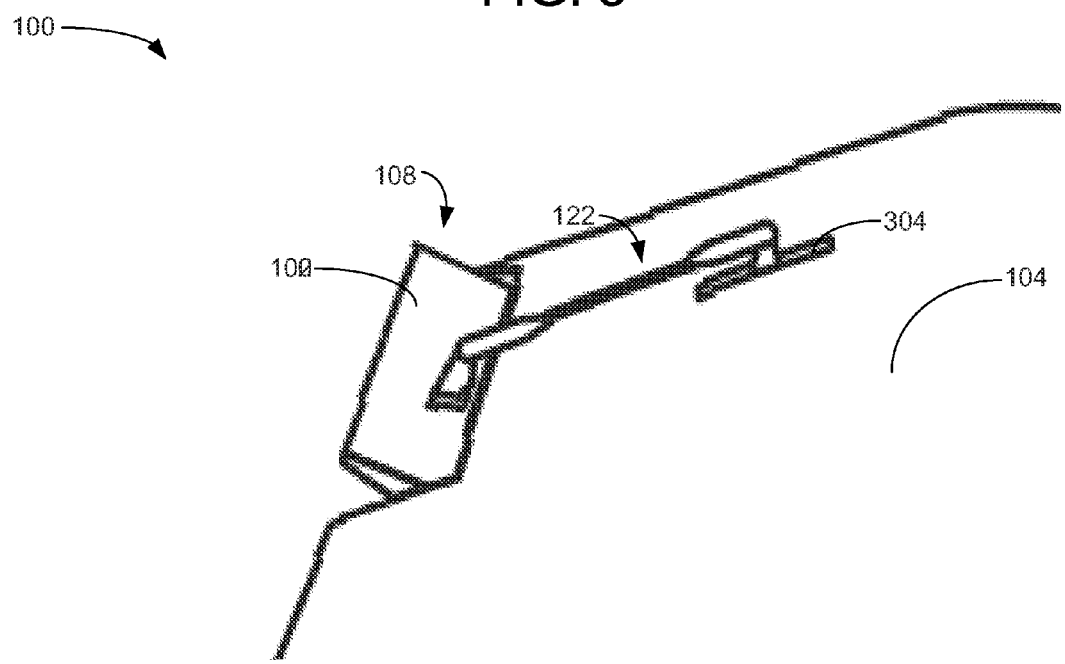
FIG. 4 is a photographic close-up view illustrating the exemplary embodiment of the safety aileron system of FIG. 3, according to a preferred embodiment of the present invention.

FIG. 4 is a photographic close-up view illustrating the exemplary embodiment of the safety aileron system 100 of FIG. 3, according to a preferred embodiment of the present invention. The rear portion 108 of safety aileron 102 can be seen positioned above the top surface 122 of wing 104. This reduces the lift on the wing 104, thereby assisting in turning the aircraft. If the aircraft 302 were in a dropped-wing stall, safety aileron 102 would turn the aircraft 302 to the left, increasing the wind speed over the right wing to cause the right wing to rise, while the drag and the air flow pattern change from the safety aileron 102 on the left wing will cause that wing to drop. Thus, the aircraft 302 can be brought back from a dropped wing stall at low altitude.

Figure 5:
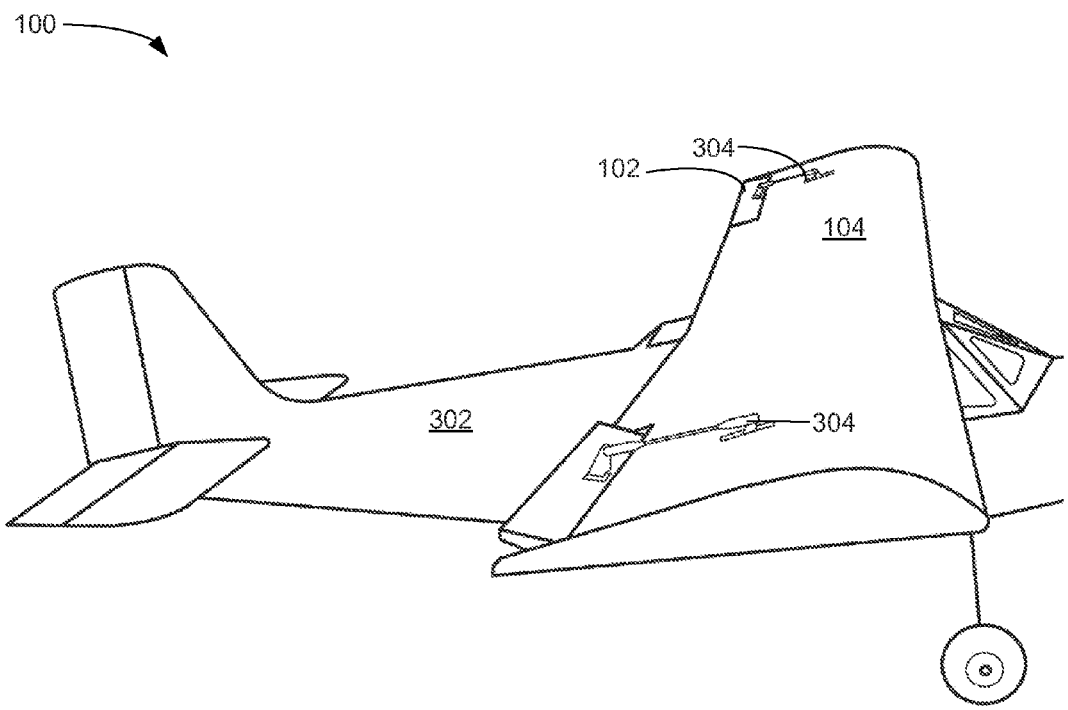
FIG. 5 is a photographic view illustrating an exemplary embodiment of the safety aileron system of FIG. 1 in a right turn configuration, according to a preferred embodiment of the present invention.

FIG. 5 is a photographic view illustrating an exemplary embodiment of the safety aileron system 100 of FIG. 1 in a right turn configuration, according to a preferred embodiment of the present invention. UAV test aircraft 302 has two safety ailerons 102 with actuators 304. The safety aileron 102 on the right wing 104 is shown in a right turn configuration for normal flight and in a configuration to avoid a left-dropped-wing stall in a dropped-wing stall avoidance flight regime. Left-wing safety aileron 102 is not activated. If the aircraft 302 were in a dropped-wing stall, safety aileron 102 would turn the aircraft 302 to the right, increasing the wind speed over the dropped left wing to cause the left wing to rise, while the drag and the air flow pattern change from the safety aileron 102 on the right wing will cause that wing to drop. Thus, the aircraft 302 can be brought back from a dropped wing stall at low altitude.

Figure 6:
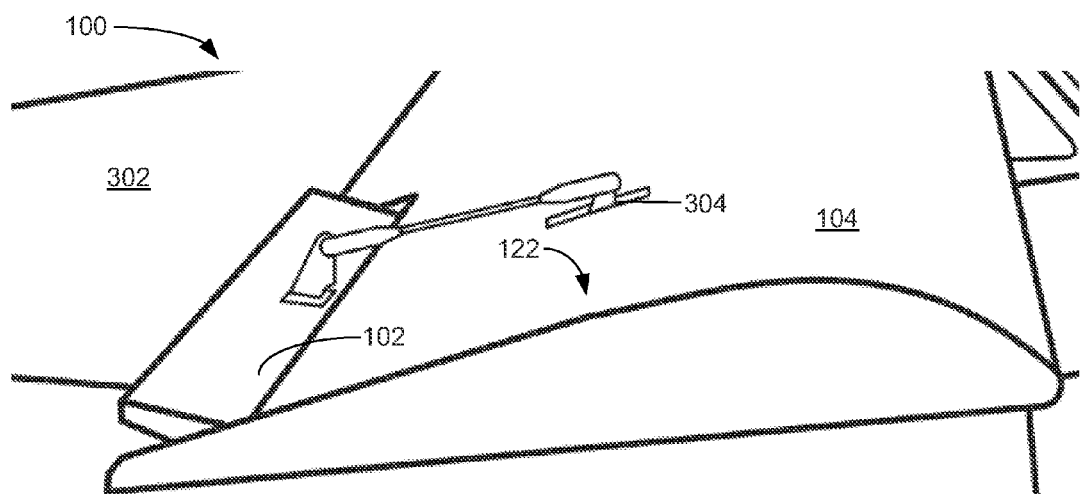
FIG. 6 is a photographic close-up view illustrating the exemplary embodiment of the safety aileron system of FIG. 5, according to a preferred embodiment of the present invention.

FIG. 6 is a photographic close-up view illustrating the exemplary embodiment of the safety aileron system 100 of FIG. 5, according to a preferred embodiment of the present invention. The rear portion 108 of safety aileron 102 can be seen positioned above the top surface 122 of wing 104. The forward portion 110 of safety aileron 102 extends below the bottom surface 120 (see FIG. 2)

Figure 7:
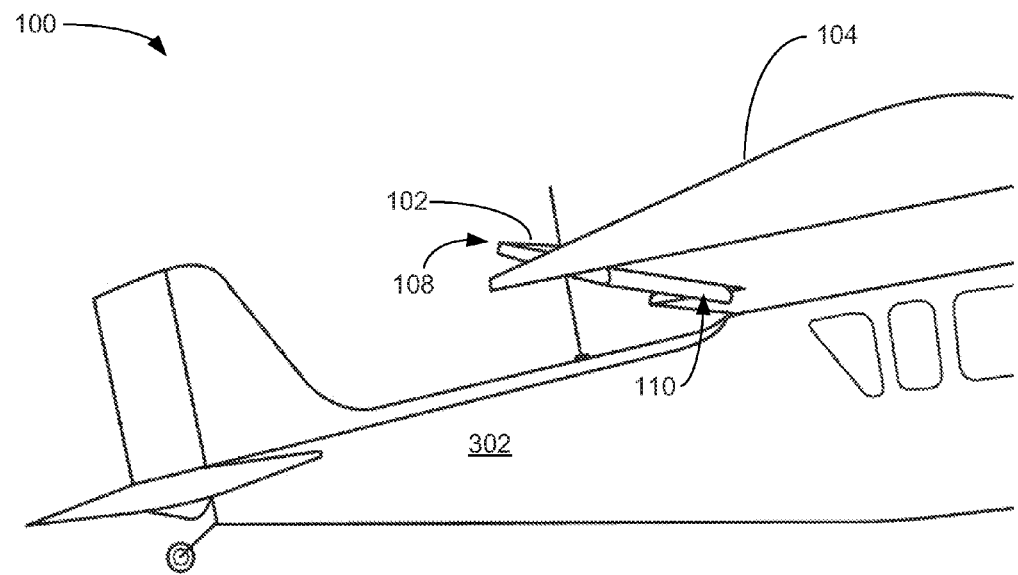
FIG. 7 is a second photographic view illustrating an exemplary embodiment of the safety aileron system of FIG. 1 in a right turn configuration of FIG. 5, according to a preferred embodiment of the present invention.

FIG. 7 is a second photographic view illustrating an exemplary embodiment of the safety aileron system 100 of FIG. 1 in a right turn configuration of FIG. 5, according to a preferred embodiment of the present invention. The forward portion 110 of safety aileron 102 can be seen positioned below the wing 104 to induce drag to generate yaw to assist with turning the aircraft 302. The rear portion 108 of safety aileron 102 is positioned above the wing 104 to reduce lift and so bank the turn in normal operation or correct a dropped-wing stall condition using the normal pilot responsive movement of the yoke.

Figure 8:
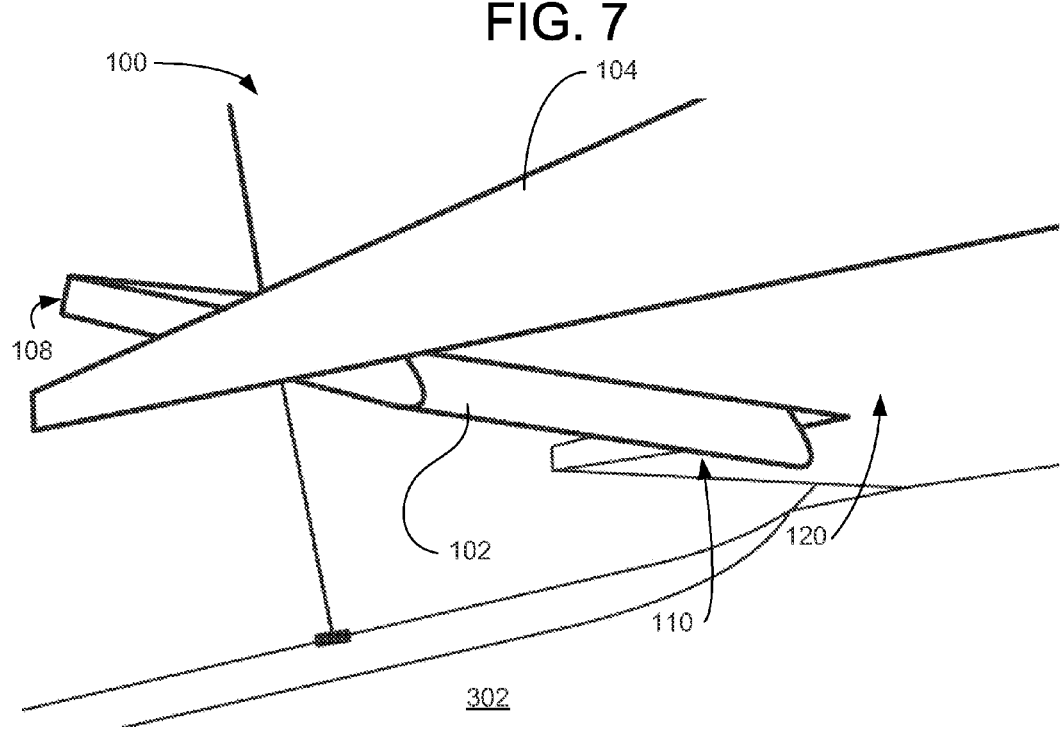
FIG. 8 is a photographic close-up view illustrating the exemplary embodiment of the safety aileron system of FIG. 7, according to a preferred embodiment of the present invention.

FIG. 8 is a photographic close-up view illustrating the exemplary embodiment of the safety aileron system 100 of FIG. 7, according to a preferred embodiment of the present invention. Forward portion 110 is below the bottom surface 120 of the wing 104.

Safety aileron system 100 will meet FAA Part 23 regulations for stall resistant aircraft and aircraft equipped with safety aileron system 100 will not require special training for dealing with low altitude stall warnings, as the habitual or intuitive pilot response will be the correct response.

Location of the pivot axis 106 and the best pivot angle α must be determined for each aircraft design and can be accomplished by a person of ordinary skill in that art (an aerospace engineer with aircraft design experience) without undue experimentation.

I claim:

1. A safety aileron system, comprising an aircraft having
   a. first and second wings further comprising:
      i. an airfoil type defining a shape;
      ii. first and second top wing surfaces, respectively;
      iii. first and second bottom wing surfaces, respectively; and
      iv. first and second aft portions, respectively;
   b. first and second individually operable ailerons integral with said first and second aft portions, respectively; and
   c. for each aileron of said first and second ailerons, a pivot axis positioned to enable rotation of said aileron to a position in which a front portion of said aileron extends below a bottom surface of said respective wing and a rear portion of said aileron extends above said top surface of said respective wing wherein said pivot axis comprises a mechanically repositionable pivot axis.

2. The safety aileron system of claim 1, wherein said first and second ailerons are controllable to enable only one of said first aileron and said second aileron to rotate at any particular time.

3. The safety aileron system of claim 1, wherein said first and second ailerons are shaped to conform to said shape of said airfoil type of said first and second wings, respectively, when said first and second ailerons are not rotated.

4. The safety aileron system of claim 1, wherein said aircraft comprises a control yoke and:
   a. said first aileron is operable to rotate, responsive to a first particular movement of said control yoke, to turn the aircraft in a first direction; and
   b. said second aileron is operable to rotate, responsive to a second particular movement of said control yoke, to turn the aircraft in a second direction.

5. The safety aileron system of claim 1, wherein:
   a. said first aileron is operable to rotate, responsive to a first particular movement of the control yoke, to correct a dropped-wing stall condition on said second wing; and
   b. said second aileron is operable to rotate, responsive to a second particular movement of the control yoke, to correct a dropped-wing stall condition on said first wing.

6. The safety aileron system of claim 1, further comprising first and second gaps between forward ends of said first and second ailerons and first and second rear surfaces of said first and second wings, respectively.

7. The safety aileron system of claim 6, further comprising at least one top gap cover extending between a top surface of said wing and a top surface of said respective aileron and operable to resist airflow through said gap at least when said aileron is not rotated.

8. The safety aileron system of claim 6, further comprising at least one bottom gap cover extending between a bottom surface of said wing and a bottom surface of said respective aileron and operable to resist airflow through said gap at least when said aileron is not rotated.

9. The safety aileron system of claim 1, further comprising first and second actuators for rotating said first and second ailerons, respectively, wherein said first and second actuators are mounted on said first and second top wing surfaces, respectively.

10. A safety aileron system, comprising an aircraft having
    a. first and second wings further comprising:
       i. an airfoil type defining a shape;
       ii. first and second top wing surfaces, respectively;
       iii. first and second bottom wing surfaces, respectively; and
       iv. first and second aft portions, respectively;
    b. first and second individually operable ailerons integral with said first and second aft portions, respectively;
    c. for each aileron of said first and second ailerons, a pivot axis positioned to enable rotation of said aileron to a position in which a front portion of said aileron extends below a bottom surface of said respective wing and a rear portion of said aileron extends above said top surface of said respective wing; and
    d. wherein said first and second ailerons are controllable to enable only one of said first aileron and said second aileron to rotate at any particular time wherein said pivot axis comprises a mechanically repositionable pivot axis.

11. The safety aileron system of claim 10, wherein said first and second ailerons are shaped to conform to said shape of said airfoil type of said first and second wings, respectively, when said first and second ailerons are not rotated.

12. The safety aileron system of claim 10, wherein said aircraft comprises a control yoke and:
    a. said first aileron is operable to rotate, responsive to a first particular movement of said control yoke, to turn the aircraft in a first direction; and
    b. said second aileron is operable to rotate, responsive to a second particular movement of said control yoke, to turn the aircraft in a second direction.

13. The safety aileron system of claim 10, wherein:
    a. said first aileron is operable to rotate, responsive to a first particular movement of the control yoke, to correct a dropped-wing stall condition on said second wing; and
    b. said second aileron is operable to rotate, responsive to a second particular movement of the control yoke, to correct a dropped-wing stall condition on said first wing.

14. The safety aileron system of claim 10, further comprising first and second actuators for rotating said first and second ailerons, respectively, wherein said first and second actuators are mounted on said first and second top wing surfaces, respectively.

15. The safety aileron system of claim 10, further comprising first and second gaps between forward ends of said first and second ailerons and first and second rear surfaces of said first and second wings, respectively.

16. The safety aileron system of claim 15, further comprising at least one top gap cover extending between a top surface of said wing and a top surface of said respective aileron and operable to resist airflow through said gap at least when said aileron is not rotated.

17. The safety aileron system of claim 15, further comprising at least one bottom gap cover extending between a bottom surface of said wing and a bottom surface of said respective aileron and operable to resist airflow through said gap at least when said aileron is not rotated.

18. A safety aileron system, comprising:
a. an aircraft having
   i. first and second wings further comprising:
      1) an airfoil type defining a shape;
      2) first and second top wing surfaces, respectively;
      3) first and second bottom wing surfaces, respectively;
      4) first and second aft portions, respectively; and
   ii. a control yoke;
b. first and second individually operable ailerons integral with said first and second aft portions, respectively;
c. for each aileron of said first and second ailerons, a pivot axis that is one of positioned and positionable to enable rotation of said aileron to a position in which a front portion of said aileron extends below a bottom surface of said respective wing and a rear portion of said aileron extends above said top surface of said respective wing;
d. said first and second ailerons are shaped to conform to said shape of said airfoil type of said first and second wings, respectively, when said first and second ailerons are not rotated; and
e. wherein said first and second ailerons are controllable to enable only one of said first aileron and said second aileron to rotate at any particular time;
f. said first aileron is operable to rotate, responsive to a first particular movement of the control yoke, to correct a dropped-wing stall condition on said second wing;
g. said second aileron is operable to rotate, responsive to a second particular movement of the control yoke, to correct a dropped-wing stall condition on said first wing;
h. said first aileron is operable to rotate, responsive to said first particular movement of said control yoke, to turn the aircraft in a first direction; and
i. said second aileron is operable to rotate, responsive to said second particular movement of said control yoke, to turn the aircraft in a second direction.

* * * * *